United States Patent
Jacobson et al.

(10) Patent No.: US 11,349,721 B2
(45) Date of Patent: May 31, 2022

(54) DISCOVERING SWITCH PORT LOCATIONS AND INTERNET PROTOCOL ADDRESSES OF COMPUTE NODES

(71) Applicant: Hewlett Packard Enterprise Development LP, Houston, TX (US)

(72) Inventors: Erik Jacobson, Eagan, MN (US); Corneliu Mihai Boac, Eagan, MN (US); Karl Witthuhn, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 39 days.

(21) Appl. No.: 16/850,204

(22) Filed: Apr. 16, 2020

(65) Prior Publication Data
US 2021/0328874 A1    Oct. 21, 2021

(51) Int. Cl.
| | |
|---|---|
| *G06F 15/173* | (2006.01) |
| *H04L 41/12* | (2022.01) |
| *H04L 61/5007* | (2022.01) |
| *H04L 101/622* | (2022.01) |
| *H04L 61/10* | (2022.01) |
| *H04L 61/103* | (2022.01) |
| *G06F 9/4401* | (2018.01) |

(52) U.S. Cl.
CPC ............ *H04L 41/12* (2013.01); *G06F 9/4401* (2013.01); *H04L 61/10* (2013.01); *H04L 61/103* (2013.01); *H04L 61/2007* (2013.01); *H04L 61/6022* (2013.01)

(58) Field of Classification Search
CPC ... H04L 41/12; H04L 61/103; H04L 61/2007; H04L 61/6022
USPC .................................. 370/254–255; 709/223
See application file for complete search history.

(56) References Cited

U.S. PATENT DOCUMENTS

| | | | |
|---|---|---|---|
| 8,625,463 | B2 | 1/2014 | Gantenbein et al. |
| 9,037,748 | B2 * | 5/2015 | Nguyen ............. H04L 43/0811 709/242 |
| 9,253,140 | B2 | 2/2016 | Kapadia et al. |
| 10,530,680 | B2 | 1/2020 | Mihelich et al. |
| 10,531,592 | B1 | 1/2020 | Jau et al. |

(Continued)

OTHER PUBLICATIONS

Manage Engine, "Switch Port Mapping Tool," 2020, pp. 1-14, Zoho Corp., Retrieved from the Internet on Feb. 24, 2020 at URL: http://manageengine.com/products/oputils/switch-port-mapper.html.

*Primary Examiner* — Hee Soo Kim
(74) *Attorney, Agent, or Firm* — Jaffery Watson Mendonsa & Hamilton (57) ABSTRACT

A high performance (HPC) system is described. The system includes a plurality of compute nodes, each comprising a network interface having a first media access control (MAC) address and a management controller having a second MAC address, a plurality of switches, coupled to the plurality of compute nodes, each including one or more ports and a head node, communicatively coupled to the plurality of switches, comprising one or more processors to discover a first of the plurality of compute nodes, including facilitating installation of a boot file at the first compute node, initiate a boot operation at the first compute node using the boot file, harvesting switch port locations from the plurality of switches and detecting a location of the first compute node within the network based on determining one or more switch port locations associated with the first MAC address of the first compute node.

18 Claims, 5 Drawing Sheets

(56) References Cited

U.S. PATENT DOCUMENTS

| | | | |
|---|---|---|---|
| 2009/0077208 A1* | 3/2009 | Nguyen | H04L 61/2015 709/221 |
| 2009/0129290 A1* | 5/2009 | Seo | H04L 41/12 370/254 |
| 2014/0129819 A1* | 5/2014 | Huang | G06F 9/4416 713/2 |
| 2018/0189177 A1* | 7/2018 | Guim Bernat | H04L 67/06 |
| 2018/0212924 A1* | 7/2018 | Li | G06F 9/4406 |
| 2019/0090154 A1* | 3/2019 | Olderdissen | H04L 61/2015 |
| 2019/0182117 A1* | 6/2019 | Bower, III | H04L 49/15 |
| 2019/0273716 A1* | 9/2019 | Sundarababu | H04L 61/2015 |

* cited by examiner

DISCOVERING SWITCH PORT LOCATIONS AND INTERNET PROTOCOL ADDRESSES OF COMPUTE NODES

BACKGROUND

High-performance computing (HPC) provides the ability to process data and perform complex calculations at high speeds. An HPC cluster is a collection of many separate servers (computers), called nodes, which are connected via a fast interconnect. An HPC cluster includes different types of nodes that perform different tasks, including a head node, data transfer node, compute nodes and a switch fabric to connect all of the nodes. Exascale computing refers to a HPC system that is capable of at least a quintillion (e.g., a billion billion) calculations per second (or one exaFLOPS).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Exascale clusters include thousands of compute nodes that need to be configured. One challenge in configuring these compute nodes is a process of discovering all of the nodes and ensuring that host names and assigned geolocation information provides an indication as to where equipment is located. Specifically, recognizing an exact location of the equipment is critical in resolving failing parts, as well for proper load balancing for cluster services. These services include node installation, monitoring, and load balancing of network filesystems. For example, system location is urgent during an execution of a load on a subset of nodes in order to monitor heat spread in a data center.

Computer systems that couple to a network comprise a hardware address (e.g., media access control address (MAC) address). A MAC address is a unique identifier within a network tied to the Network Interface Controller (NIC) that connects to the network, and is associated with services that provide IP addresses (e.g., Dynamic Host Configuration Protocol (DHCP)). Typically, MAC addresses are unique in the world so that no two network interface controllers in the world have the same MAC address. Some systems have multiple network ports in a single controller, in which case each port has a unique MAC address. In a large cluster, locating the MAC addresses of all the hardware is a critical step in locating compute nodes. Such cluster hardware typically includes MAC addresses for both a node network connection and a Baseboard Management Controller (e.g., Integrated Lights-Out (iLO)). The BMC enables remote power on, power off, and monitoring of a compute node.

Often, a factory that assembles the components that comprises a node motherboard provides the node MAC addresses (e.g., via a spreadsheet document). Accordingly, a final-assembly process may be implemented to track which nodes (e.g., serial number or other identifier) are installed, node locations and in a manner in which the system locations are coupled to the MAC addresses. Moreover, such information may be used to create a cluster configuration file that ties host names, geolocation, and MAC addresses to bring up a cluster.

However, this information is not always available. For example, it is not uncommon for thousands of compute nodes to be incorporated into a cluster with no documentation as to which MAC addresses are part of the system. This presents a challenge in which there is no process for a cluster manager to locate any particular node within the cluster.

In embodiments, a mechanism is provided to quickly discover nodes added to a cluster by discovering compute node MAC addresses in a cluster network based on switch port locations in management switches. In further embodiments the discovered addresses are used to configure host names and geolocation information for the respective compute nodes.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
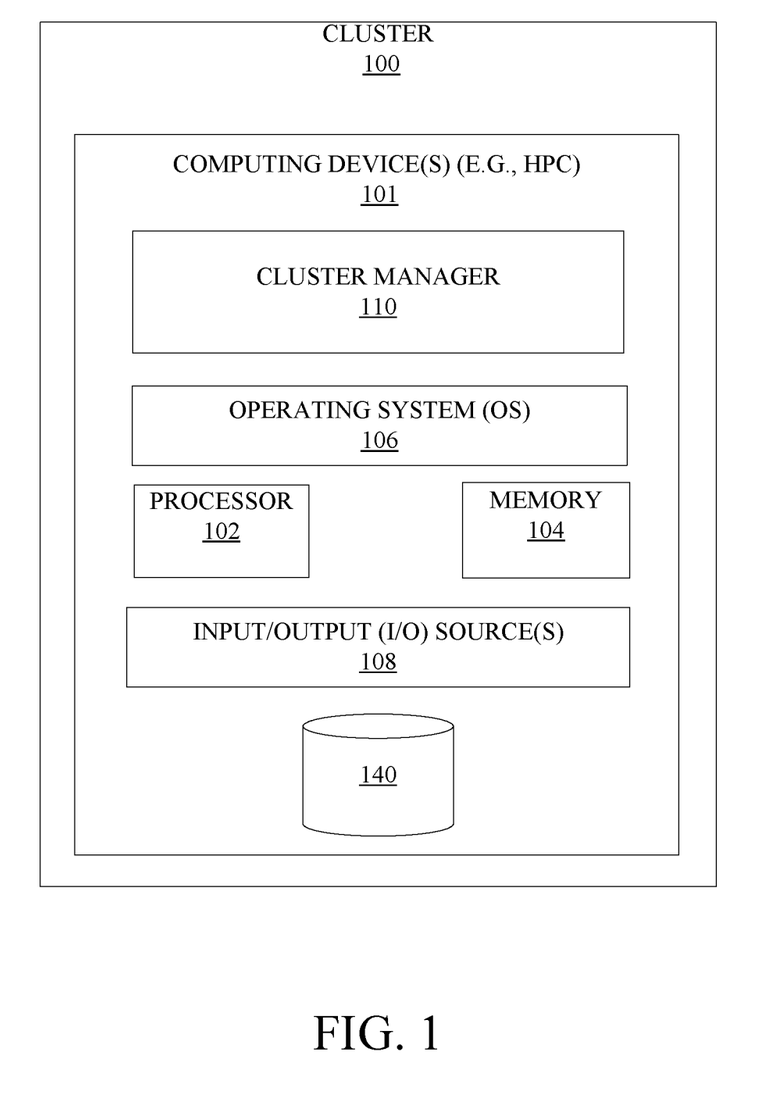
FIG. 1 illustrates one embodiment of a system.

FIG. 1 illustrates one embodiment of a cluster 100. As shown in FIG. 1, data cluster 100 includes one or more computing devices 101 that operate as high-performance computing (HPC) cluster components. In embodiments, a computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/

O") sources 108, such as touchscreens, touch panels, touch pads, virtual or regular keyboards, virtual or regular mice, etc.

In one embodiment, computing device 101 includes a server computer that may be further in communication with one or more databases or storage repositories, such as database 140, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a cluster manager 110 to manage cluster 100. In one embodiment, cluster manager 110 provides for provisioning, management (e.g., image management, software updates, power management and cluster health management, etc.) and monitoring of cluster nodes. In a further embodiment, cluster manager 110 provides for configuration of cluster compute nodes. In such an embodiment, cluster manager 110 configuration components that provides for the discovery of compute nodes within the cluster based on a received cluster configuration file that is used to define nodes within the cluster with the proper MAC addresses and host names.

Figure 2:
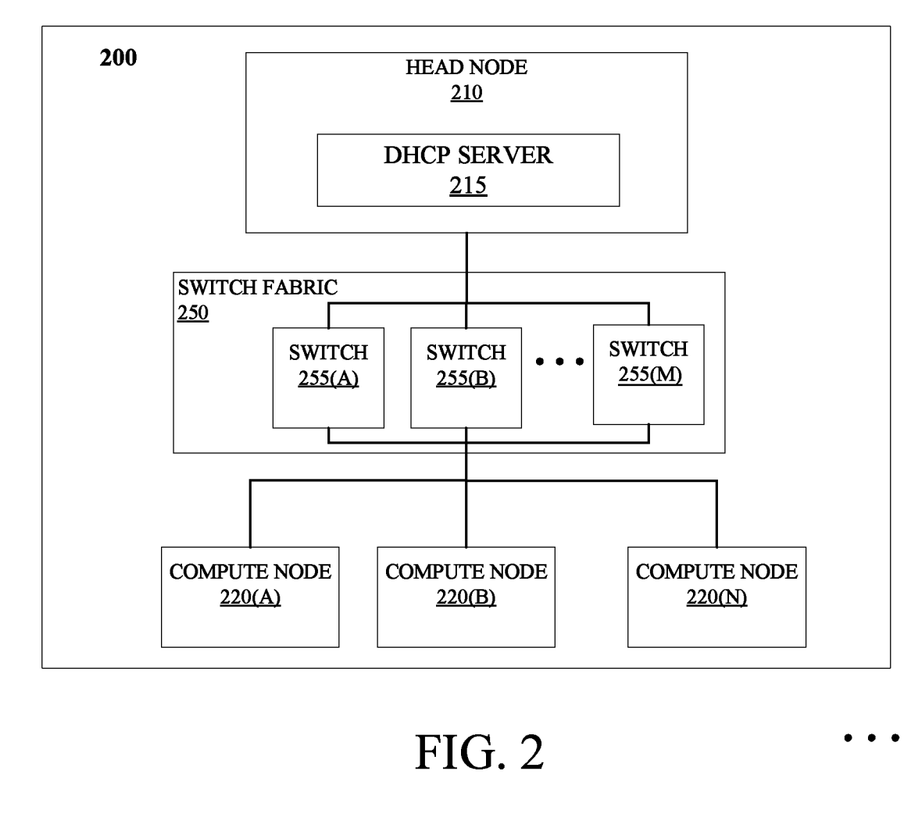
FIG. 2 is a block diagram illustrating one embodiment of a HPC cluster.

FIG. 2 is a block diagram illustrating one embodiment of a HPC cluster 200. As shown in FIG. 2, cluster 200 includes a head node 210 coupled to compute nodes 220 (e.g., compute nodes 220(A)-220(N)) coupled via a switch fabric 250. Head node 210 provides management and job scheduling services to the cluster of compute nodes 220. In one embodiment, head node 210 operates as a launching point for workloads (or jobs) for processing at compute nodes 220

Compute nodes 220 perform computational operations to execute workloads. In one embodiment, compute nodes 220 operate in parallel to process the workloads. Switch fabric 250 comprises a network of switches that interconnect head node 210 and compute nodes 220. According to one embodiment, switch fabric 250 comprises switches 255 (e.g., switches 255(A)-255(M)). In such an embodiment, switches 255 are management switches that provide Out-Of-Band (OOB) connectivity to each compute node 220.

Figure 3:
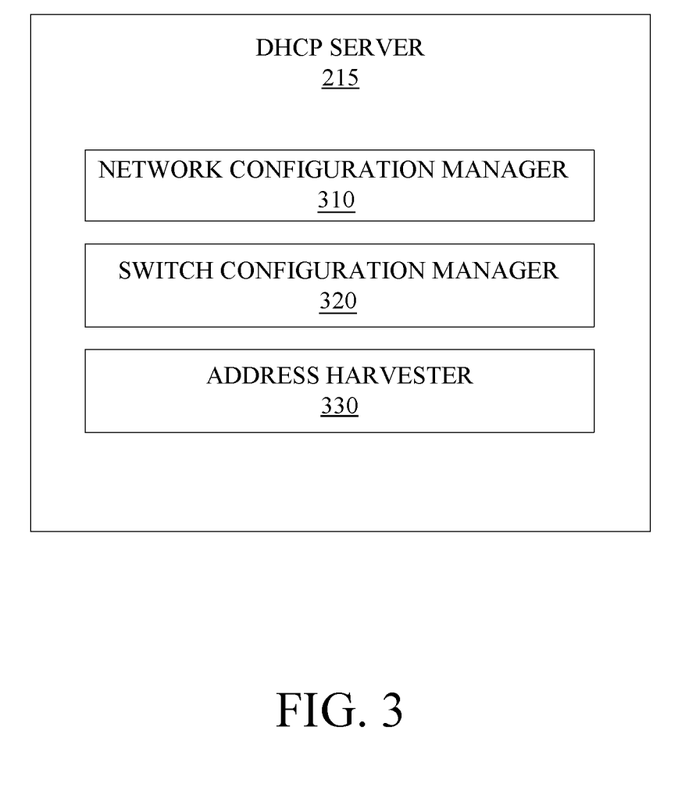
FIG. 3 is a block diagram illustrating one embodiment of a head node.

Head node 210 includes a DHCP server 215 to facilitate discovery of compute nodes 220. In one embodiment, DHCP server 215 automatically provides and assigns IP addresses, default gateways and other network parameters to compute nodes 220. FIG. 3 is a block diagram illustrating one embodiment of DHCP server 215. As shown in FIG. 3, DHCP server 215 includes a network configuration manager 310, switch configuration manager 320 and address harvester 330.

Network configuration manager 310 is implemented to configure the HPC cluster 200 network. In one embodiment, network configuration manager 310 may operate within a virtual machine or container, or may operate native on head node 210. In other embodiments, network configuration manager 310 may operate on any other administrative node of the cluster designated to perform the service. Network configuration manager 310 provides IP addresses to all compute nodes that are added to cluster 200. In such an embodiment, network configuration manager 310 also provides separate IP addresses to BMCs included in each node.

In a further embodiment, network configuration manager 310 may assign node (or host) MAC addresses and BMC MAC addresses in separate network ranges. In this embodiment, the separation of BMC MACs from host MACs on the same physical network could be implemented by using the DHCP client identifier returned by a BMC in its DHCP request. The DHCP server can be configured to take the client identifier into consideration when serving IP addresses and thus adjust the network range accordingly. For example, a BMC sets a client identifier that uniquely defines it as a BMC. Other BMCs may do this similarly. This allows the solution to separate the networks and therefore act on a range that is known to be all BMCs or all hosts by configuring the DHCP server to put nodes with the client ID set in to a different network range. Thus, host MAC addresses are assigned within a host network address range (or pool), while BMC MAC addresses are assigned within a BMC network address pool. For example, a 172.24.0.0/16 network may be implemented to pool the BMC IP addresses while the 172.23.0.0/16 network may be implemented to pool host IP addresses. In this way, any IP address within the 172.24.0.0 network is known to be a BMC and not a host.

Figure 4:
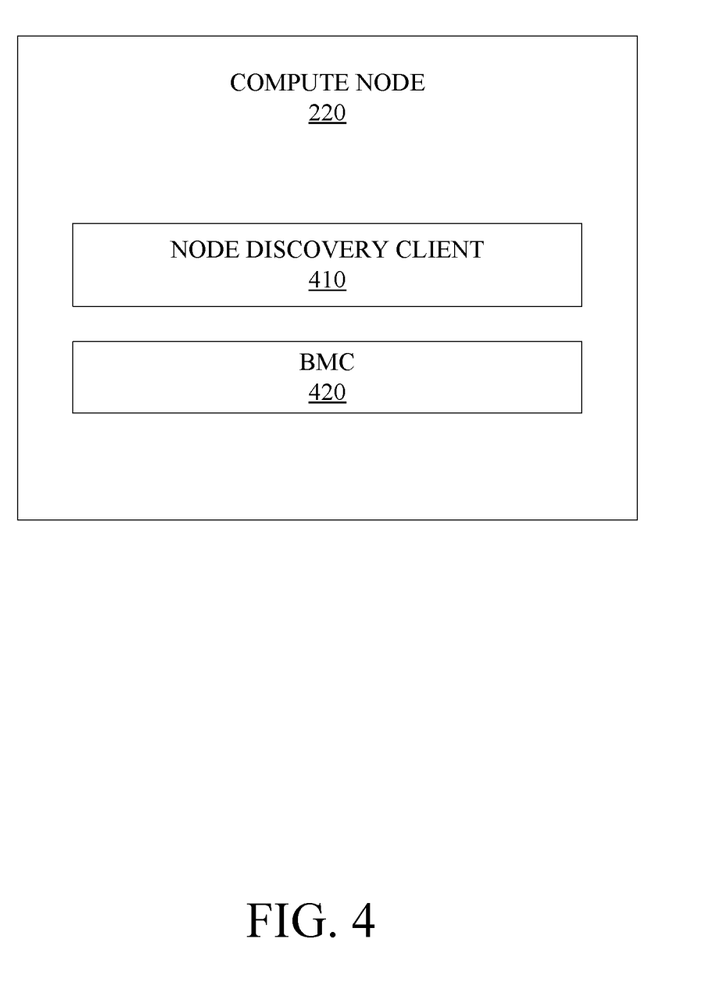
FIG. 4 is a block diagram illustrating one embodiment of a compute node.

Network configuration manager 310 also facilitates boot operations at compute nodes 220. In this embodiment, network configuration manager 310 ensures that a boot file (e.g., bootloader setup and kernel and initial ramdisk (initrd) boot images) is setup at compute nodes 220 that need to be booted. In one embodiment, each compute node 220 includes a node discovery client 410 that is booted by the Network Configuration Manager 310.

FIG. 4 illustrates one embodiment of a compute node 220 including node discovery client 410. According to one embodiment, client 410 is an operating system environment to configure a BMC 420 at compute note 220 to ensure that the BMC 420 receives an IP address via DHCP. This is useful because some BMCs are not configured to request an IP address by using DHCP by default. At scale, this could otherwise involve connecting a laptop to each node in order to connect to the BMC and turn on DHCP.

In a further embodiment, client 410 may be implemented to configure username, password, and console settings at BMC 420. This may be performed via a client 410 interface (e.g., via Linux ipmitool) to avoid having to communicate with BMC 420 via network. Often, the compute nodes that make up a cluster include BMCs that are configured with random passwords for security. These passwords may be manually placed on a label that is physically attached to each server. However, such a scheme is not convenient in a cluster having thousands of nodes since it requires an operator having to manually collect and store the passwords. Therefore in embodiments, client 410 implements a kernel interface (e.g., an ipmitool command) to the BMC 420 that requires no authentication when run as root or administrative user) to set a known username and password in BMC 420.

In further embodiments, the password may be a cluster-wide BMC password that is the same on all nodes, or may be a per-node random password that is configured and saved into the cluster manager database. In still further embodiments, the kernel interface operates with an operating system kernel module (e.g., Linux) that is able to communicate to BMC 420 to configure the BMC 420.

In a further embodiment, client 410 maintains sufficient network traffic between compute node 220 and head node 210 to ensure that switches 255 are aware of the node. In yet a further embodiment, client 410 ensures that an address resolution protocol (ARP) table at head node 210 remains updated with information from compute node 220. In such an embodiment, client 410 uses information from switches 255. Thus, a compute node 220 maintains registration with switches 255 so that the compute node has not expired from the MAC address table associated with any switch port. As defined herein, ARP is a communication protocol used for discovering the link layer address, such as a MAC address, associated with an internet layer address (e.g., Internet Protocol version 4 (IPv4)).

In embodiments in which BMC 420 provides an interface (e.g., Intelligent Platform Management Interface (IPMI)), client 410 retrieves the BMC MAC addresses via the interface. In such embodiments, the interface may be used to validate a MAC offset method, or to avoid using the offsets, as described in more detail below. A validated BMC MAC address is subsequently matched with the associated host MAC address. Client 410 may retrieve other information via the interface (e.g., BMC username), as well as read Basic Input/Output System (BIOS) information. On some platforms where the BMC password is shipped as a unique string, the password can be derived from details supplied by BIOS to the operating system running in the client. This and other useful inventory data can be obtained by, for example, using a Linux dmidecode command. This may be transmitted to cluster manager 110 to be stored.

Referring back to FIG. 3, network configuration manager 310 assigns new MAC addresses (host and BMC) once compute nodes 220 are booted up. Subsequently, network configuration manager 310 performs a loop to contact each compute node 220 via the node BMC. Each compute node 220 reboots once the addresses are assigned. As a result, the node and its BMC 420 is reset.

Switch configuration manager 320 is configured to log into switches 255 using cluster manager 110 (e.g., via switchconfig). In one embodiment, switch configuration manager 320 is a service that may operate within a virtual machine or container. In such an embodiment, switch configuration manager 320 may use a command line tool to work with switches (e.g., such as switchconfig in a cluster manager). However, in other embodiments, switch configuration manager 320 may also directly communicate with switches 255 (e.g., using command line interface (CLI) calls, or Representational state transfer (REST) application programming interface (API) calls to switches that support that interface.

In one embodiment, switch configuration manager 320 interfaces with each switch 255 in order to retrieve a listing of all switch ports at a switch 255, as well as the MAC addresses that are associated with each switch port. According to one embodiment, the switch configuration manager 320 uses the switch port information to match the host and BMC MAC addresses for each compute node for each determines an order of the MAC addresses. Switch configuration manager 320 lists all known MAC addresses under each switch port in an increasing sequential manner which allows for similar MAC address formatting to be naturally grouped together.

Figure 5:
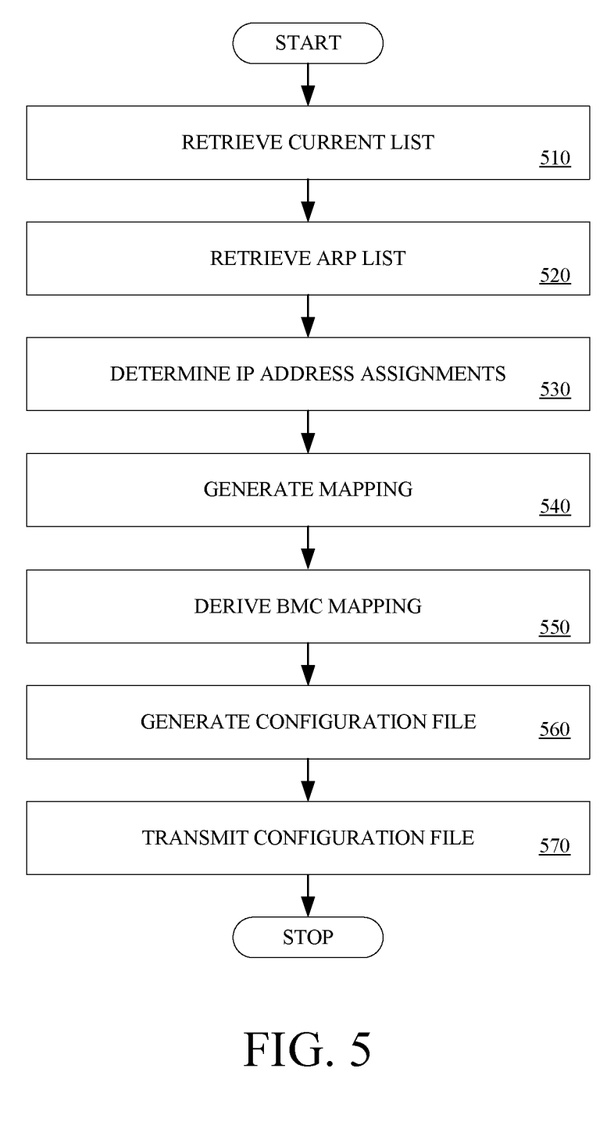
FIG. 5 illustrates one embodiment of an address harvesting process.

Address harvester 330 receives the list of MAC addresses associated and stores the list to memory. FIG. 5 illustrates one embodiment of an address harvesting process performed by address harvester 330. At processing block 510, a list of all switches 255 and all MACs on all switch ports is retrieved (e.g., from switch configuration manager). As a result, a current listing of all switches and switch ports, and associated MAC addresses, in the cluster is known. Subsequently, the list is stored to memory. At processing block 520, information is retrieved from the ARP table stored at head node (or any node or container acting in the capacity of a head node) 210 and stored to memory. According to one embodiment, switch ports with more than one MAC attached may be discarded in modes of operation where it is known that hosts being discovered are connected to the switch in such a way that only one MAC is configured for the port. For example, if the host BMC is connected to one port and the host itself is connected to another port, for a typical compute node, there will only be one MAC address in each of those switch ports. When operating in this mode, switch ports with multiple MACs are known to not be hosts. Thus, cascaded switch ports, or anything else not matching a 1:1 port map configuration, may be discarded.

At processing block 530, a determination is made as to the IP addresses that have been assigned to newly added nodes. In one embodiment, this is determined by examining the information from the ARP list and the list of switch ports and associating IP addresses with MAC addresses. In a further embodiment, if known BMC MAC offsets are available, the BMC IP addresses may be disregarded since those IP addresses may be derived from the host MAC address. In one example, the BMC MAC address of the node is a predetermined offset from the host MAC address. This enables the BMC address to be derived from the host MAC without having to perform additional processing. Accordingly, the BMC MAC address may be determined once the location within the cluster and the host MAC address is determined.

At processing block 540, a mapping is generated of new host MAC addresses and associated switch and switch ports. In one embodiment, the mapping is performed by discarding all MAC addresses and switch ports that are associated with compute nodes 220 that are not in the assigned discovery range (e.g., the host address pool) are discarded. At processing block 550, the BMC MAC address is derived using the configured offset. As discussed above, a BMC address is derived using the predetermined offset from the host MAC address.

At processing block 560, a cluster configuration file including the new host information is generated. As discussed above, the configuration file provides ties host names, geolocation, and MAC addresses associated with each compute node 220. Thus, the configuration file includes all of the nodes with the proper MAC addresses and host names. In one embodiment, simple incremental names may be used in order (e.g., n0, n1, n2, n3). However, in other embodiments, a template may be defined that includes switch number and port number in the name (e.g., s0p1, s0p2, s1p1). The BMCs may be similarly named (e.g., the hostname, plus -ilo, -bmc, or -ipmi extensions).

In a further embodiment, the configuration file may include geolocation data based on rules for the cluster. In such an embodiment, a switch name and switch port may be saved in the geolocation information for storage in a cluster manager database. In some cluster managers, commands are run to add or modify the nodes instead of using a configuration file. In such an embodiment, the commands are executed as needed instead of using a configuration file. In some cluster managers, it is possible to use an API to programmatically add nodes. An example might be a REST call to the cluster manager backend that contains one, multiple, or all nodes to be added.

At processing block 570, the configuration file is transmitted to cluster manager 110. In one embodiment, network configuration manager 310 removes the node discovery environment (e.g., switch configuration manager 320 and address harvester 330) once the discovery has been performed. Subsequently, network configuration manager 310 resets all new nodes as discussed above.

The above-described mechanism enables a rapid recognition of MAC addresses in a cluster system and uses that information to configure host names and geolocation information.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
   a plurality of compute nodes, wherein each compute node of the plurality of compute node comprises:
      a network interface having a first media access control (MAC) address; and
      a management controller having a second MAC address;
   a plurality of switches, coupled to the plurality of compute nodes, wherein each switch of the plurality of switches comprises one or more ports; and
   a head node, communicatively coupled to the plurality of switches, wherein the head node comprises one or more processors to:
      discover a first compute node of the plurality of compute nodes, including facilitating installation of a boot file at the first compute node;
      initiate a boot operation at the first compute node using the boot file;
      harvest switch port locations from the plurality of switches;
      determine one or more switch port locations associated with the first MAC address of the first compute node;
      generate a list of the plurality of switches;
      associate a plurality of MAC addresses of the plurality of compute nodes with the switch ports; and
      compare information retrieved from an Address Resolution Protocol (ARP) table with the list to determine an internet protocol (IP) address associated with another compute node of the plurality of compute nodes.

2. The system of claim 1, wherein the one or more processors to further assign an internet protocol (IP) address to the node network interface of each compute node of the plurality of compute nodes and assign an IP address to the management controller of each compute node of the plurality of compute nodes.

3. The system of claim 2, wherein the one or more processors to create a first range of IP addresses associated with the network interfaces of the plurality of compute nodes and create a second range of IP addresses associated with the management controllers of the plurality of compute nodes.

4. The system of claim 1, wherein the one or more processors to associate a plurality of MAC addresses of the plurality of compute nodes with the switch ports.

5. The system of claim 4, wherein the one or more processors to generate a mapping of the plurality of MAC addresses to the switch ports.

6. The system of claim 5, wherein the one or more processors, in the generation of the mapping, to discard MAC addresses and switch ports that do not have internet protocol (IP) addresses in a first range of a plurality of IP addresses associated with the network interfaces of the plurality of compute nodes.

7. The system of claim 1, wherein the one or more processors to derive the second MAC address of the first compute node from the first MAC address of the first compute node.

8. The system of claim 1, wherein the one or more processors to retrieve the second MAC address of the first compute node via the management controller of the first compute node.

9. The system of claim 1, wherein the one or more processors to generate a configuration file, wherein the configuration file includes names and MAC addresses associated with each compute node of the plurality of compute nodes.

10. A method comprising:
    facilitating installation of a boot file at a first compute node of a plurality of compute nodes;
    initiating a boot operation at the first compute node using the boot file;
    harvesting switch port locations from a plurality of switches;
    determining one or more switch port locations associated with a first media access control (MAC) address of the first compute node;
    generating a list of the plurality of switches;
    associating a plurality of MAC addresses of the plurality of compute nodes with switch ports of the plurality of switches; and
    comparing information received from an Address Resolution Protocol (ARP) table with the list to determine an internet protocol (IP) address associated with another compute node of the plurality of compute nodes.

11. The method of claim 10, further comprising assigning an internet protocol (IP) address to a network interface of each compute node of the plurality of compute nodes and assigning an IP address to a management controller of each compute node of the plurality of compute nodes.

12. The method of claim 11, further comprising creating a first range of IP addresses associated with the network interfaces and creating a second range of IP addresses associated with the management controllers.

13. The method of claim 10, further comprising associating MAC addresses of the plurality of compute nodes with the switch ports.

14. The method of claim 13, further comprising:
generating a mapping by discarding MAC addresses of the MAC addresses and switch ports of the switch ports which are not in the first range of IP addresses; and
generating a configuration file, wherein the configuration file includes names, geolocations and the MAC addresses.

15. A non-transitory machine-readable medium storing instructions which, when executed by a processor, cause the processor to:
facilitate installation of a boot file at a first compute node of a plurality of compute nodes;
initiate a boot operation at the first compute node using the boot file;
harvest switch port locations from a plurality of switches;
determine one or more switch port locations associated with a first media access controller (MAC) address of the first compute node;
generate a list of the plurality of switches;
associate a plurality of MAC addresses of the plurality of compute nodes with the switch ports; and
compare information retrieved from an Address Resolution Protocol (ARP) table with the list to determine an internet protocol (IP) address associated with another compute node of the plurality of compute nodes.

16. The non-transitory machine-readable medium of claim 15, storing instructions which, when executed by a processor, cause the processor to assign an Internet protocol (IP) address to a network interface of each compute node of the plurality of compute nodes and assign an IP address to a management controller of each compute node of the plurality of compute nodes.

17. The non-transitory machine-readable medium of claim 16, storing instructions which, when executed by a processor, cause the processor to create a first range of IP addresses associated with network interfaces of the plurality of compute nodes and create a second range of IP addresses associated with management controllers of the plurality of compute nodes.

18. The non-transitory machine-readable medium of claim 17, storing instructions which, when executed by a processor, cause the processor to:
generate a mapping by discarding MAC addresses of a plurality of MAC addresses of the plurality of compute nodes which are not associated with the first range of IP addresses; and
generate a configuration file, wherein the configuration file includes names, geolocations and the plurality of MAC addresses.

* * * * *